Feb. 13, 1923.
M. D. RATHBUN.
FENDER DEVICE.
FILED JUNE 5, 1922.
1,445,238.
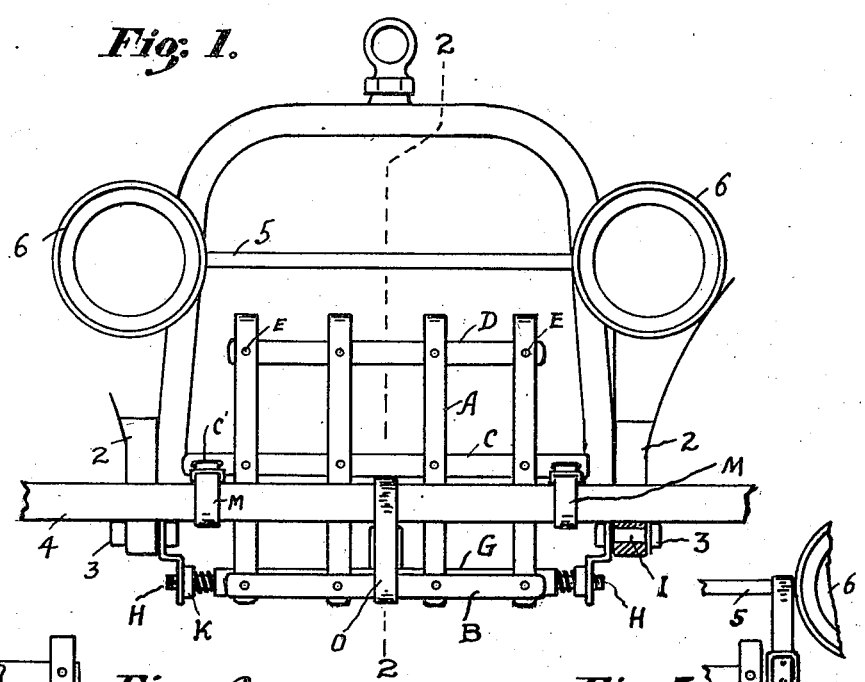
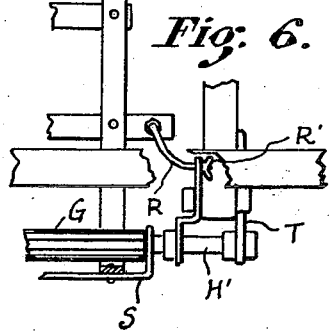
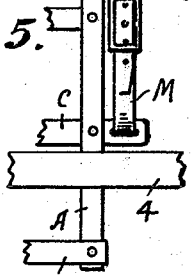
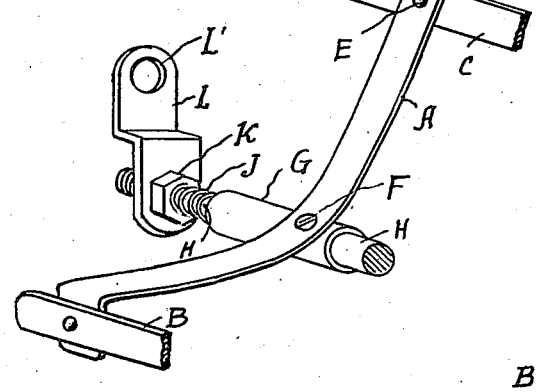
INVENTOR
MILO D. RATHBUN.
BY Thomas L. Ryan
ATTORNEY.

Feb. 13, 1923.
M. D. RATHBUN.
FENDER DEVICE.
FILED JUNE 5, 1922.
1,445,238.
2 SHEETS—SHEET 2.
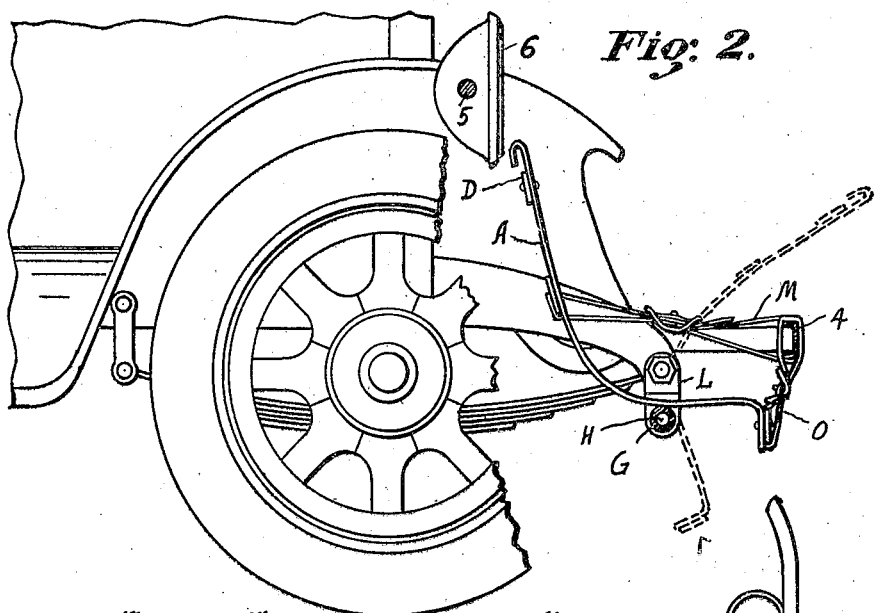
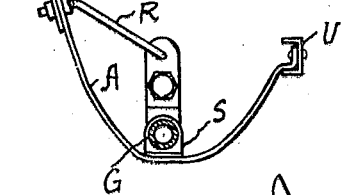
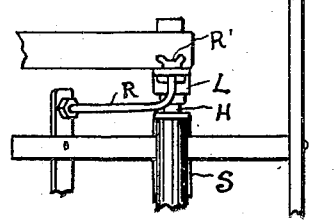
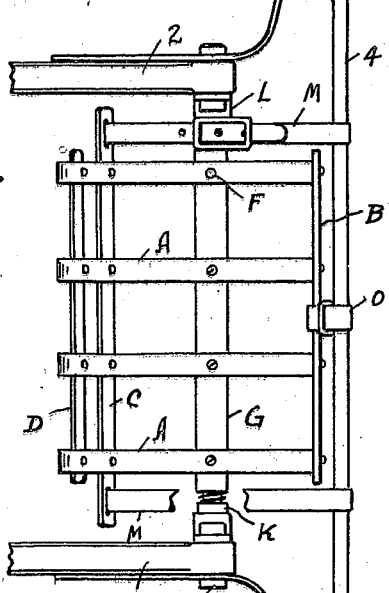
INVENTOR.
MILO D. RATHBUN.
BY Thomas L. Ryan
ATTORNEY Patented Feb. 13, 1923.

1,445,238

UNITED STATES PATENT OFFICE.

MILO D. RATHBUN, OF MUNCIE, INDIANA.

FENDER DEVICE.

Application filed June 5, 1922. Serial No. 566,122.

*To all whom it may concern:*

Be it known that I, MILO D. RATHBUN, a citizen of the United States, residing at Muncie, in the county of Delaware and State of Indiana, have invented certain new and useful Improvements in Fender Devices, of which the following is a specification.

The present invention relates to improvements in fender devices for automobiles, and has for its object to provide a device of this character that is capable of being affixed to the frontal portion of an automobile or other vehicle, which will act as a fender shield or carrier. The fender device may be used in combination with any standard type of bumper bar, and so operates that the pedestrian who may be accidentally struck, is lodged on the fender or shield, instead of being perhaps thrown violently against the front of the car, or of being thrown down or caused to fall under the car.

I am aware that devices of the above character have heretofore been devised in various forms, and the objects of the present invention are to provide a fender device and carrier which is economical in construction, light in weight and strong and durable, and which is capable of being easily installed on any type of automobile, and in combination with standard types of bumper bars.

The objects of the invention are accomplished by and the invention is embodied in the new construction, combination and arrangement of parts described in the following specification, and shown in the annexed drawings. The invention is defined in the appended claims.

Suitable characters of reference are applied to the several parts of the device as they appear in the different views in the drawings—in which—

Figure 1 is a front view of my improved fender and carrier device installed in combination with a standard form of pumper bar.

Figure 2 is a side view of the frontal portion of an automobile upon which the invention is installed, the invention being shown in vertical longitudinal section taken on the line 2—2 in Figure 1.

Figure 3 is a top plan view of the invention as shown in Figure 2.

Figure 4 is a detached perspective view showing details of construction of the resilient fender frame.

Figure 5 is a modified form of connection of the fender frame to a frame member of the car.

Figure 6, Figure 7 and Figure 8, are front, side and plan views respectively, of modifications.

The invention is shown arranged in combination with a bumper bar and connections of standard type; and comprises a frame like structure of light open construction and the quality of resiliency, and which frame is adapted to be retained between the bumper bar and the front or radiator of the car. Flexible connections between the said fender frame, and the frame members of the car, are adapted to retain the said fender frame yieldably at normal position, and to prevent vibration or rattling.

The preferred form of fender frame consists of a plurality of metal bars A about one inch wide and three sixteenths of an inch thick, arranged vertically. The upper ends of the bars are curled to give a smooth exterior and neat appearance. These bars are bent to form somewhat similar to that of a chair, as shown clearly in Figure 2 and in Figure 4, the forward ends being bent downwardly at substantially a right angle, and each being secured by a rivet bolt, or screw to the face bar B. The intermediate bar C, and the top bar D are secured to the vertical bars A by rivets or by bolts E, the former being preferred.

Near the ends of the intermediate bar C are the slots $C^1$ and in which slots are engaged the flexible connections hereinafter described.

At location on the vertical bars A where they spring upwardly, they are secured to a transverse bearing member or shaft by suitable countersunk screws F. This bearing member consists of a stout hollow shaft G which is of a length suitably greater than the distance between the extreme outer edges of the outer bars A and A, and as shown in Figures 1 and 4.

In the ends of the hollow shaft G are disposed slidingly, studs H and H. Each of these studs consists of a round bar of diameter to slidingly fit in the bore of the said hollow shaft G, and its outer end is threaded and provided with a lock nut K. Each stud is screwed through a threaded hole therefor in a connector clip L. This connector clip is made of sheet metal of the angular form shown in Fig. 4, and its free end is provided with an opening or hole $L^1$, It is apparent that this clip may be easily disposed on the bolt 1 of the frame member 2 of the car, and may be secured at such position by tightening the nut 3 of the said bolt. These members known as the "shackle bolt" and "shackle nut" are of usual construction and assembly.

By the construction above described, such clearance between the nut K and the end of the shaft G is provided, that variation of the distance between the frame members 2 and 2 of the car, is compensated. Thus, the fender frame is easily adaptable to use on cars of all standard makes regardless of the dimensions or distance between the said car frame members. Light spiral springs J may be disposed between the end of the shaft G and the nut K and by which the frame is retained against transverse shifting.

The position of the fender frame, with reference to the bumper bar and the radiator and the head light of the car, is adjustable to suit the user. A flexible strap M made preferably of leather, has connection at the slot C¹ and with the bumper bar 4. By the adjusting of this strap M, there is obtained the adjustment vertically of the fender frame. When the desired position of the fender frame has been so obtained, (as shown in Figure 2) then a second strap O which is engaged over the central location on the bumper bar, and about the face bar B of the fender frame is tightened and the installation is complete.

It is contemplated that my invention may be used without combination with the bumper bar, and in which instance the straps M only are used. The said straps M are looped over the usual connecting bar 5 between the head lamps 6 and 6, and as shown in the modification illustrated in Figure 5. See also the modified connection rod R in Figure 6.

In instances where it may be desirable to shift the position of the fender frame so that access to the crank for the motor may be had, the strap O is unbuckled or released, and the fender frame may be swung to the dotted line position, as shown in Figure 2. Similarly, the modified frame as shown in Figure 6 may be unfastened by removing the wing nut R¹ of the rod R. In this modification, the frame bars A extend below the cross bar G and are supported on the transverse bar or stirrup S, and thence extend upwardly, and to their ends are connected the shield or bumper bar or channel U.

A fender device constructed in accordance with my invention is light in weight, strong and durable, and besides being of utility, is ornamental to the car upon which it is installed. The preferred type of installation is in combination with a bumper bar of the general type as shown in Figure 3. The invention complete, as an article of manufacture comprises the fender frame proper, the flexible straps M and O, and the studs H and clip connections L. The invention when affixed to the front of the car, as shown in the drawings, constitutes a fender and carrier device of utility and service. As a life guard or safety device its effectiveness is apparent, as the pedestrian who may by accident be run down by the automobile is caught or shielded by the fender frame and injury which otherwise might occur from being thrown against the radiator or perhaps underneath the car, is prevented.

I am aware that minor changes may be made in the construction of my invention, and of the several details and parts shown in the present specification, without departing from the spirit of the invention or sacrificing any of its advantages. Desirable forms of applying my inventions are shown in Figures 5, and 6, 7 and 8. In these modifications the frontal bar of the fender is elongated, and modified means for connecting the fender device to the car frame, is used.

What I claim as my invention, and desire to secure by Letters Patent is:

1. In combination with the bumper bar, a resilient frame positioned immediately at the rear of the bumper bar and adapted to occupy normally an upright position, connections for fastening the fender frame loosely to the frame of the car, and flexible connections between the car frame and the bumper bar to retain the said resilient frame at yieldable operative position.

2. In combination with the bumper bar, a resilient fender frame having its lower portion disposed forwardly, a transverse support member, connections between the support member and the frame members of the car, detachable flexible connections between the upper portion of the fender frame and the bumper bar, and detachable flexible connections between the forward portion of the fender frame and the bumper bar, substantially as described.

3. A fender of the kind described, comprising a resilient frame adapted to be disposed between the longitudinal frame members, and of chair-like form and having its lower portion to extend forwardly, a transverse hollow bearing-bar connected to the resilient frame, support studs slidably disposed in the ends of the bearing-bar, connections carried by the said studs and which are adapted to be fastened to the members of the car frame, substantially as described.

4. A fender of the kind described, comprising a resilient frame adapted to be disposed between the longitudinal frame members, and of chair-like form and having its lower portion to extend forwardly, a transverse bar connected to the resilient frame, adjustable connections between the said transverse bar and the members of the car frame, and connections between the said car frame members and the said resilient frame to support the latter at normally upright position.

5. A fender device of the kind described, comprising a resilient frame adapted to be disposed between the longitudinal frame members of the vehicle, the said resilient frame being of chair-like form and having its lower portion to extend forwardly, a transverse hollow bearing-bar connected to the resilient frame, support studs slidably disposed in the ends of the bearing bar, connections carried by the said studs and which are adapted to be fastened to the members of the car frame, and springs between the said connections and the ends of the hollow bearing-bar.

In testimony whereof I affix my signature.

MILO D. RATHBUN.